US012308508B2

(12) United States Patent
Liu et al.

(10) Patent No.: US 12,308,508 B2
(45) Date of Patent: May 20, 2025

(54) ANTENNA MOUNTING KIT FOR INTEGRATED BASE STATION ANTENNA

(71) Applicant: Outdoor Wireless Networks LLC, Claremont, NC (US)

(72) Inventors: Nengbin Liu, Jiangsu (CN); Puliang Tang, Jiangsu (CN); Zhigang Wang, Jiangsu (CN); Meihua Yin, Jiangsu (CN)

(73) Assignee: Outdoor Wireless Networks LLC, Richardson, TX (US)

( * ) Notice: Subject to any disclaimer, the term of this patent is extended or adjusted under 35 U.S.C. 154(b) by 84 days.

(21) Appl. No.: 18/322,092

(22) Filed: May 23, 2023

(65) Prior Publication Data

US 2023/0402734 A1 Dec. 14, 2023

(30) Foreign Application Priority Data

Jun. 13, 2022 (CN) ......................... 202210659307.7

(51) Int. Cl.
*H01Q 1/12* (2006.01)

(52) U.S. Cl.
CPC ................................. *H01Q 1/1228* (2013.01)

(58) Field of Classification Search
CPC ...... H01Q 1/1228; H01Q 1/12; H01Q 1/1207; H01Q 1/246; F16M 13/02
USPC .................................................. 348/878, 890
See application file for complete search history.

(56) References Cited

U.S. PATENT DOCUMENTS

2011/0168855 A1* 7/2011 Bonczyk .............. H01Q 1/1242 248/201
2021/0194109 A1* 6/2021 Shao .................... H01Q 1/1242
2021/0367320 A1* 11/2021 Wang ................... H01Q 1/1264
2022/0328949 A1* 10/2022 Han ..................... H01Q 1/1242
2023/0063114 A1* 3/2023 Wang ....................... H01Q 3/06
2023/0098517 A1* 3/2023 Wang ................... H01Q 1/1228 248/219.4
2023/0268634 A1* 8/2023 Yuan ........................ H01Q 3/04 343/702
2023/0361459 A1* 11/2023 Wang ................... H01Q 1/1264
2024/0213650 A1* 6/2024 Wang ....................... H01Q 5/42
2024/0283125 A1* 8/2024 Wang ................... H01Q 1/1228

* cited by examiner

*Primary Examiner* — Christopher Garft
(74) *Attorney, Agent, or Firm* — Myers Bigel, P.A.

(57) ABSTRACT

An antenna mounting kit for an integrated base station antenna includes: an upper mounting assembly configured to removably connect an upper portion of the integrated base station antenna to a mounting pole; a middle mounting assembly configured to removably connect a middle portion of the integrated base station antenna to the mounting pole; and a lower mounting assembly configured to removably connect a lower portion of the integrated base station antenna to the mounting pole. The antenna mounting kit can not only mount the 4G antenna unit to the mounting pole, but also mount the 5G antenna unit to the 4G antenna unit, reducing the number of components required for mounting, simplifying mounting steps, and reducing labor costs.

19 Claims, 9 Drawing Sheets

ANTENNA MOUNTING KIT FOR INTEGRATED BASE STATION ANTENNA

RELATED APPLICATION

The present application claims priority from and the benefit of Chinese Patent Application No. 202210659307.7, filed Jun. 13, 2023, the disclosure of which is hereby incorporated herein by reference in full.

FIELD OF THE INVENTION

The present disclosure relates to the field of base station antennas in general. More specifically, the present disclosure relates to an antenna mounting kit for an integrated base station antenna.

BACKGROUND OF THE INVENTION

With the development of information communication technologies such as mobile Internet and the Internet of Things (IOT), data traffic has exploded in recent years. As the number of base station antennas is increasing, station resource tensions are becoming more prominent. In order to implement rapid deployment, 5G antennas and devices are mainly added to original 4G station resources to form 5G stations, so multi-frequency base station antennas become mainstream. 4G and 5G converged base station antennas have advantages in terms of space size and wind load, which are important directions for future evolution of base station antennas.

An antenna mounting kit is used to pivotally mount a base station antenna to a mounting pole of an antenna tower, so that the antenna can adjust the tilt angle relative to the ground to adjust the main signal coverage area. In 4G and 5G integrated base station antennas, the number of antenna components increases, the weight increases, and the spacing from the mounting pole increases compared with the original base station antennas. Accordingly, the antenna mounting kit is subject to increasing torque from the integrated base station antennas. Therefore, it is desirable for the antenna mounting kit to have a more robust structure to stably mount the base station antenna to the mounting pole.

SUMMARY OF THE INVENTION

The present disclosure provides an antenna mounting kit which can overcome at least one of the above-mentioned defects in the prior products.

One aspect of the present disclosure relates to an antenna mounting kit for an integrated base station antenna, wherein the integrated base station antenna comprises a first antenna unit and a second antenna unit, the second antenna unit comprises a top connector and a bottom connector connecting the second antenna unit to the first antenna unit, and the antenna mounting kit comprises:

- an upper mounting assembly, configured to removably connect an upper portion of the integrated base station antenna to a mounting pole, and comprising an upper antenna bracket connected to the first antenna unit and an upper mounting pole bracket connected to the mounting pole, the upper antenna bracket comprising a connecting arm for connecting to the upper mounting pole bracket and a connecting portion for connecting to the top connector of the second antenna unit;
- a middle mounting assembly, configured to removably connect a middle portion of the integrated base station antenna to the mounting pole, and comprising a middle antenna bracket connected to the first antenna unit and a middle mounting pole bracket connected to the mounting pole, the middle antenna bracket comprising a connecting arm for connecting to the middle mounting pole bracket and a connecting portion for connecting to the bottom connector of the second antenna unit; and
- a lower mounting assembly, configured to removably connect a lower portion of the integrated base station antenna to the mounting pole, and comprising a lower antenna bracket connected to the first antenna unit and a lower mounting pole bracket connected to the mounting pole, the lower antenna bracket comprising a connecting arm for connecting to the lower mounting pole bracket.

In some embodiments, at least one of the upper, middle and lower mounting pole brackets comprises two mounting pole clamps opposite to each other, and a connecting bracket fixed to one of the mounting pole clamps and connecting to a connecting arm of a corresponding antenna bracket, each mounting pole clamp comprises an upper wall and a lower wall, the upper wall and the lower wall are connected to each other by at least one inner side wall at their radial inner edges, and the two mounting pole clamps abut against and are connected to the mounting pole by passing through the at least one inner side wall via bolts.

In some embodiments, the upper wall and the lower wall of each mounting pole clamp are provided with inner recesses that fit to the mounting poles in the middle parts of their radial inner edges, and the at least one inner side wall comprises two inner side walls, which are provided on the radial inner edges of the upper wall and the lower wall and are located on both sides of the inner recess respectively.

In some embodiments, the upper wall and the lower wall of each mounting pole clamp are connected to each other by outer side walls at their radial outer edges, and the upper wall, lower wall, outer side wall and inner side wall of the mounting pole clamp form a closed longitudinal cross-sectional structure.

In some embodiments, the connecting bracket comprises a base plate fixed to one of the mounting pole clamps and connecting arms extending outwardly from both ends of the base plate, and the connecting arms of the connecting bracket are connected to connecting arms of a corresponding antenna bracket by fasteners.

In some embodiments, the upper antenna bracket comprises a main panel, and the connecting portion of the upper antenna bracket protrudes outwardly from the main panel of the upper antenna bracket and is provided below the connecting arm of the upper antenna bracket.

In some embodiments, the connecting portion of the upper antenna bracket is provided in a hook shape, the top connector of the second antenna unit is provided in a barb shape, and the top connector of the second antenna unit is capable of being hooked on the connecting portion of the upper antenna bracket and connected thereto by fasteners.

In some embodiments, the connecting arm of the upper antenna bracket protrudes outwardly from the main panel of the upper antenna bracket, and is connected to the upper mounting pole bracket by fasteners.

In some embodiments, the main panel of the upper antenna bracket is provided with connection holes for connecting to the first antenna unit, and is located on left and right sides of the connecting arm of the upper antenna bracket.

In some embodiments, an area provided with the connection holes on the main panel of the upper antenna bracket is separated from an area provided with the connecting arm on the main panel of the upper antenna bracket.

In some embodiments, the middle antenna bracket comprises a main panel, and the connecting portion of the middle antenna bracket protrudes outwardly from the main panel of the middle antenna bracket and is provided above the connecting arm of the middle antenna bracket.

In some embodiments, the connecting portion of the middle antenna bracket is set as a convex portion, the bottom connector of the second antenna unit is set as a vertical plate shape, and the bottom connector of the second antenna unit abuts against the connecting portion of the middle antenna bracket and is connected thereto by fasteners.

In some embodiments, the connecting arm of the middle antenna bracket protrudes outwardly from the main panel of the middle antenna bracket, and is connected to the middle mounting pole bracket by fasteners.

In some embodiments, the main panel of the middle antenna bracket is provided with connection holes for connecting to the first antenna unit, and is located on left and right sides of the connecting arm of the middle antenna bracket.

In some embodiments, the main panel of the middle antenna bracket is provided with a tether plate extending outwardly therefrom, and the tether plate is provided with a plurality of holes for connecting to tethers.

In some embodiments, a height at which the connecting portion of the upper antenna bracket protrudes from the main panel of the upper antenna bracket is approximately equal to a height at which the connecting portion of the middle connecting bracket protrudes from the main panel of the middle antenna bracket.

In some embodiments, the lower antenna bracket comprises a main panel, and the connecting arm of the lower antenna bracket protrudes outwardly from the main panel of the lower antenna bracket, and is connected to the lower mounting pole bracket by fasteners.

In some embodiments, the main panel of the lower antenna bracket is provided with connection holes for connecting to the first antenna unit, and is located on left and right sides of the connecting arm of the lower antenna bracket.

In some embodiments, the first antenna unit and the second antenna unit are respectively a 4G antenna unit and a 5G antenna unit.

Other features and advantages of the subject technology of the present disclosure will be explained in the description below, and in part will be apparent through the description, or may be learned by practice of the subject technology of the present disclosure. The advantages of the subject technology of the present disclosure will be realized and attained through the structure particularly pointed out in the written Specification and claims hereof as well as the attached drawings.

It should be understood that both the above-mentioned general description and the following detailed description are exemplary and explanatory and are intended to provide further explanation of the subject technology of the present disclosure as claimed.

BRIEF DESCRIPTION OF THE DRAWINGS

A plurality of aspects of the present disclosure will be better understood after reading the following specific embodiments with reference to the attached drawings. Among the attached drawings.

DETAILED DESCRIPTION OF THE EMBODIMENTS OF THE INVENTION

Figure 1:
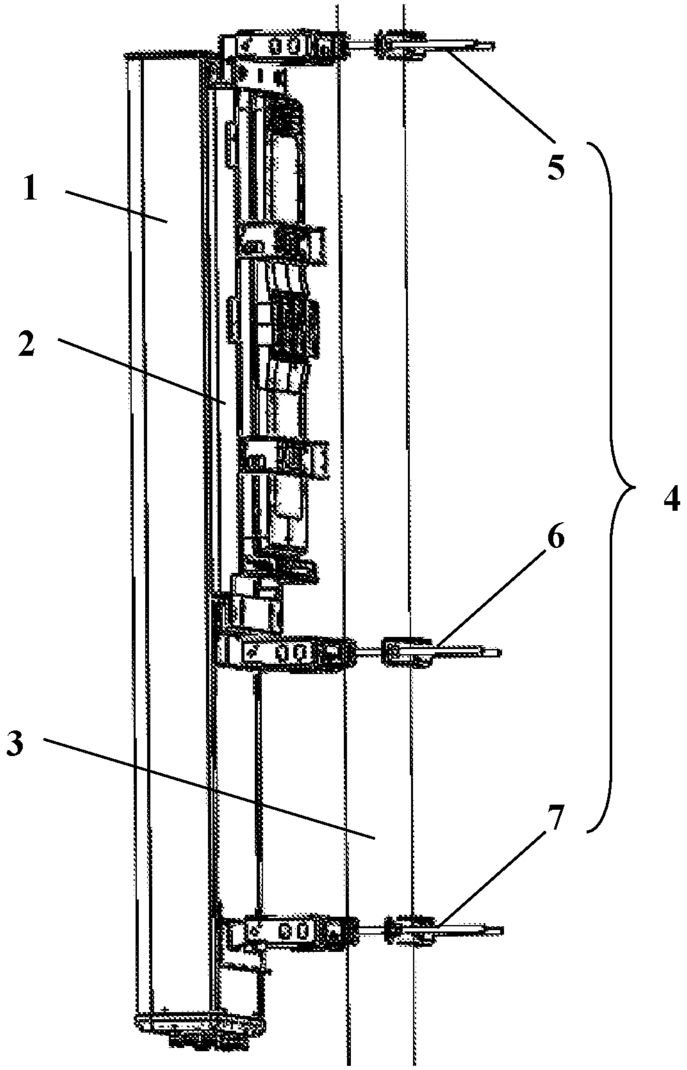
FIGS. 1 and 2 are respectively an assembled perspective view and an exploded perspective view of an integrated base station antenna with an antenna mounting kit mounted.

The present disclosure will be described below with reference to the attached drawings, wherein the attached drawings illustrate certain embodiments of the present disclosure. However, it should be understood that the present disclosure may be presented in many different ways and is not limited to the embodiments described below; in fact, the embodiments described below are intended to make the disclosure of the present disclosure more complete and to fully explain the protection scope of the present disclosure to those of ordinary skill in the art. It should also be understood that the embodiments disclosed in the present disclosure may be combined in various ways so as to provide more additional embodiments.

It should be understood that in all the attached drawings, the same symbols denote the same elements. In the attached drawings, the dimensions of certain features may be changed for clarity.

It should be understood that the words in the Specification are only used to describe specific embodiments and are not intended to limit the present disclosure. Unless otherwise defined, all terms (including technical terms and scientific terms) used in the Specification have the meanings commonly understood by those skilled in the art. For brevity and/or clarity, well-known functions or structures may not be further described in detail.

The singular forms “a”, “an”, “the” and “this” used in the Specification all include plural forms unless clearly indicated. The words “comprise”, “contain” and “have” used in the Specification indicate the presence of the claimed features, but do not exclude the presence of one or more other features. The word “and/or” used in the Specification includes any or all combinations of one or a plurality of the related listed items. The words “between X and Y” and “between approximate X and Y” used in the Specification shall be interpreted as including X and Y. As used herein, the wording “between approximate X and Y” means “between approximate X and approximate Y”, and as used herein, the wording “from approximate X to Y” means “from approximate X to approximate Y”.

In the Specification, when it is described that an element is “on” another element, “attached” to another element, “connected” to another element, “coupled” to another element, or “in contact with” another element, etc., the element may be directly on another element, attached to another element, connected to another element, coupled to another element, or in contact with another element, or an intermediate element may be present. In contrast, if an element is described as “directly” “on” another element, “directly attached” to another element, “directly connected” to another element, “directly coupled” to another element or “directly in contact with” another element, there will be no intermediate elements. In the Specification, a feature that is arranged “adjacent” to another feature, may denote that a feature has a part that overlaps an adjacent feature or a part located above or below the adjacent feature.

In the Specification, words expressing spatial relations such as “upper”, “lower”, “left”, “right”, “front”, “rear”, “top”, and “bottom” may describe the relation between one feature and another feature in the attached drawings. It should be understood that, in addition to the locations shown in the attached drawings, the words expressing spatial relations further include different locations of a device in use or operation. For example, when a device in the attached drawings is turned upside down, the features originally described as being “below” other features now can be described as being “above” the other features”. The device may also be oriented by other means (rotated by 90 degrees or at other locations), and at this time, a relative spatial relation will be explained accordingly.

Figure 2:
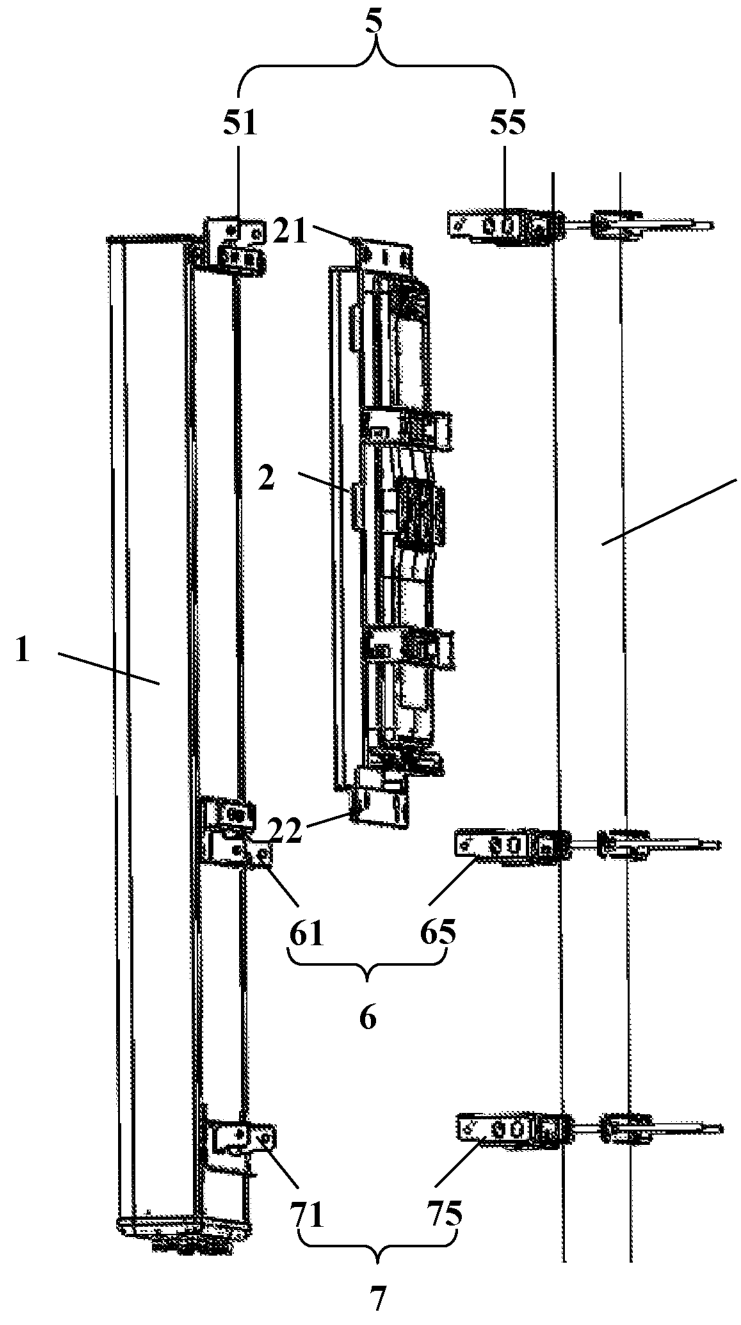

FIGS. 1 and 2 show an assembled perspective view and an exploded perspective view of an integrated base station antenna with an antenna mounting kit mounted according to an embodiment of the present disclosure. As shown in the figures, the integrated base station antenna includes a first antenna unit 1 and a second antenna unit 2 mounted together. The first antenna unit 1 and the second antenna unit 2 may transmit signals in the same or different frequency bands, and may be, for example, a 4G antenna unit and a 5G antenna unit, respectively. An antenna mounting kit 4 is used to mount the integrated base station antenna to a mounting pole 3, and includes an upper mounting assembly 5, a middle mounting assembly 6, and a lower mounting assembly 7 spaced apart in a vertical direction. The upper mounting assembly 5, the middle mounting assembly 6 and the lower mounting assembly 7 are respectively used to removably connect an upper portion, a middle portion and a lower portion of the integrated base station antenna to the mounting pole 3.

Figure 3A:
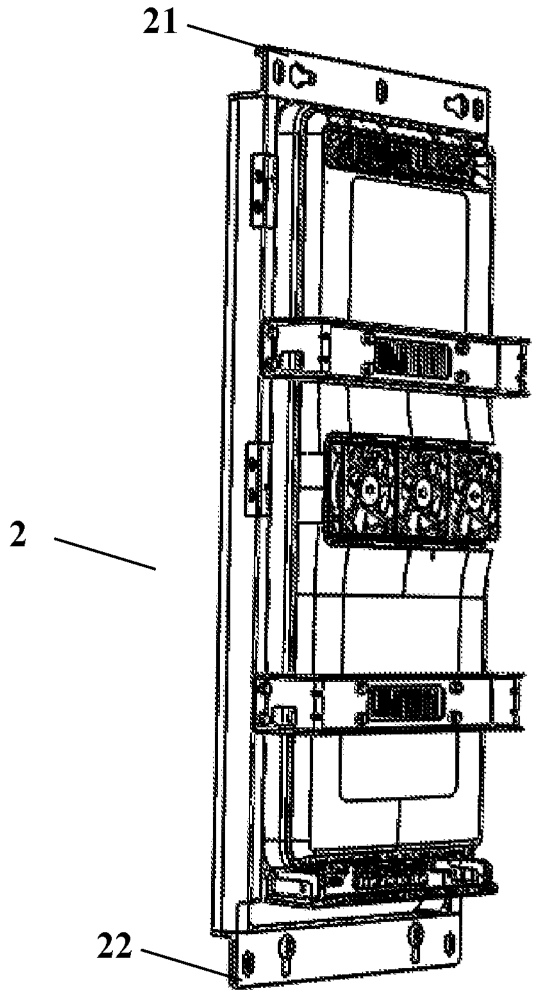
FIGS. 3A-3C are respectively a perspective view, a top enlarged view and a bottom enlarged view of a second antenna unit of the integrated base station antenna shown in FIGS. 1 and 2, respectively.
Figure 3B:
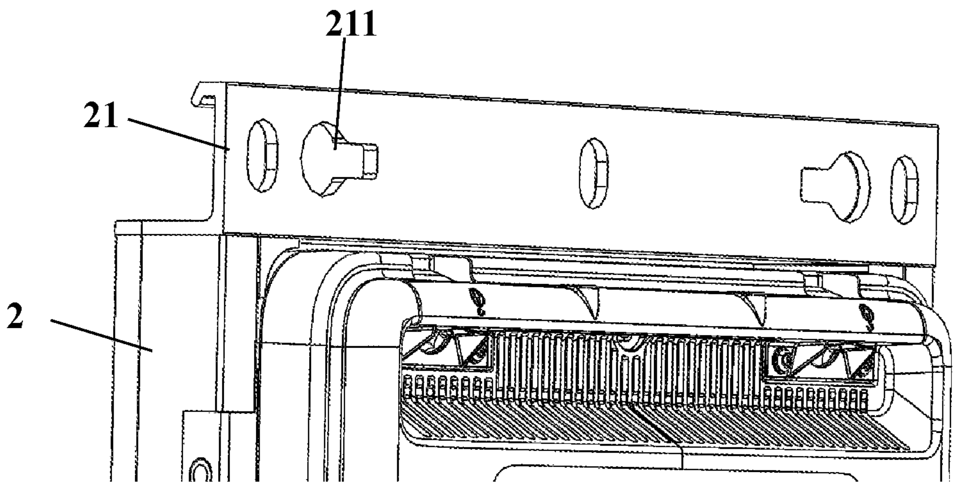
Figure 3C:
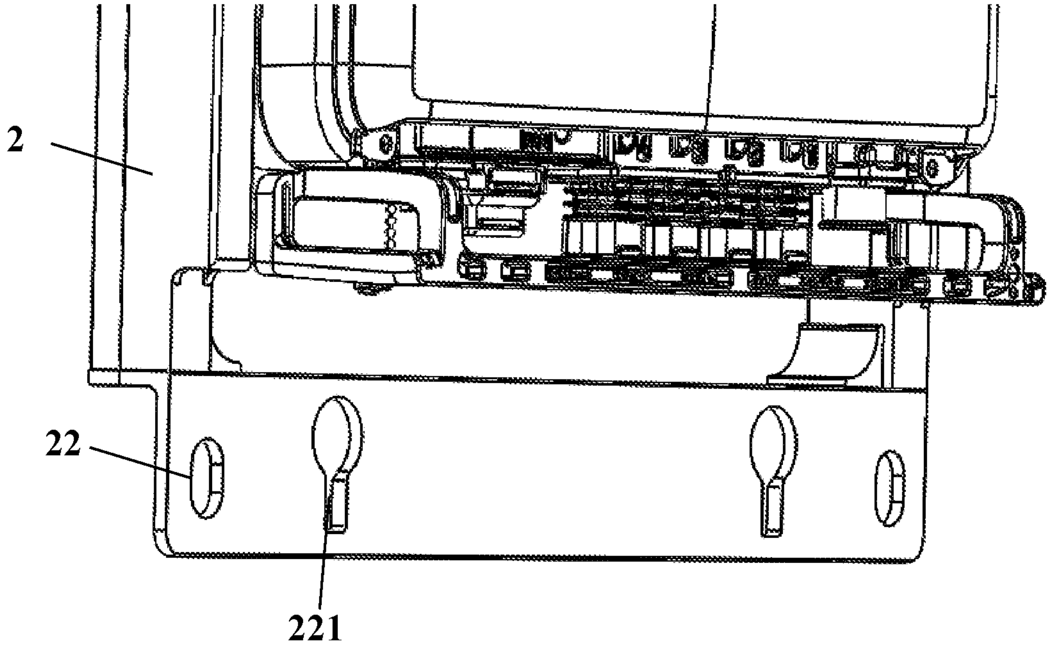

The second antenna unit 2 is connected to the first antenna unit 1 through the upper mounting assembly 5 and the middle mounting assembly 6. FIGS. 3A-3C respectively show a perspective view, a top enlarged view and a bottom enlarged view of the second antenna unit 2. As shown in the figures, the second antenna unit 2 includes a top connector 21 and a bottom connector 22 for connecting the second antenna unit 2 to the first antenna unit 1. The top connector 21 is generally L-shaped, protrudes upwardly from a top surface of the second antenna unit 2, and has a barb or hook at its upper end. The top connector 21 is provided with two or more connection holes 211 on a vertical portion thereof to receive fasteners (e.g., bolts) for connecting to the upper mounting assembly 5. The bottom connector 22 protrudes downwardly from a bottom surface of the second antenna unit 2. The bottom connector 22 is provided with two or more connection holes 221 on a vertical portion for receiving fasteners (e.g., bolts) for connecting to the middle mounting assembly 6.

Figure 4A:
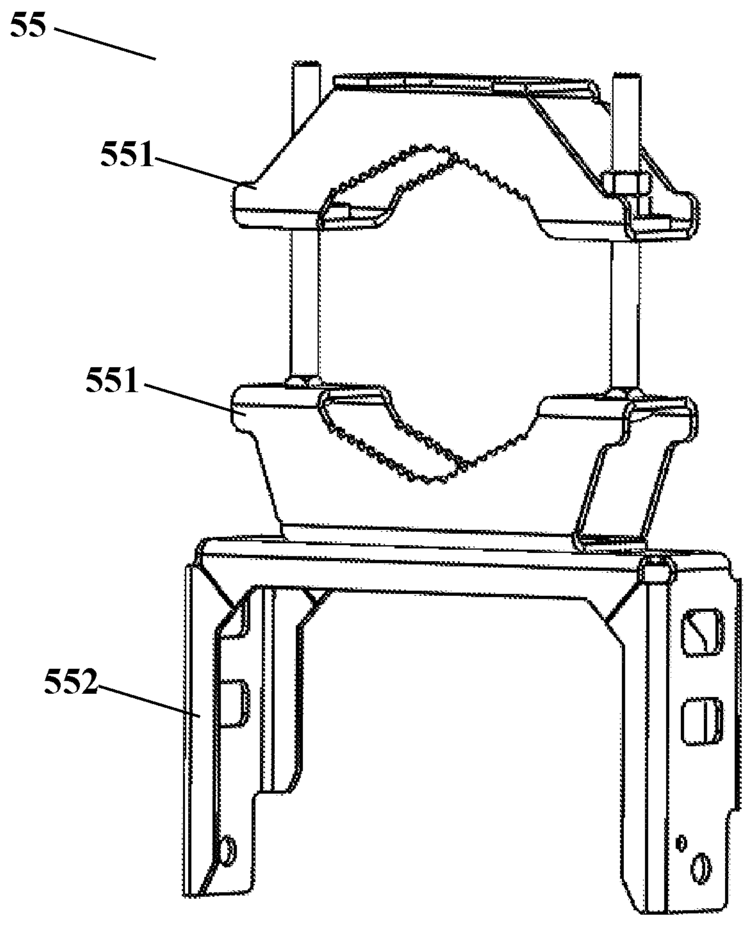
FIGS. 4A-4C respectively show a perspective view of a mounting pole rack and its mounting pole clamp and a connecting rack.
Figure 4B:
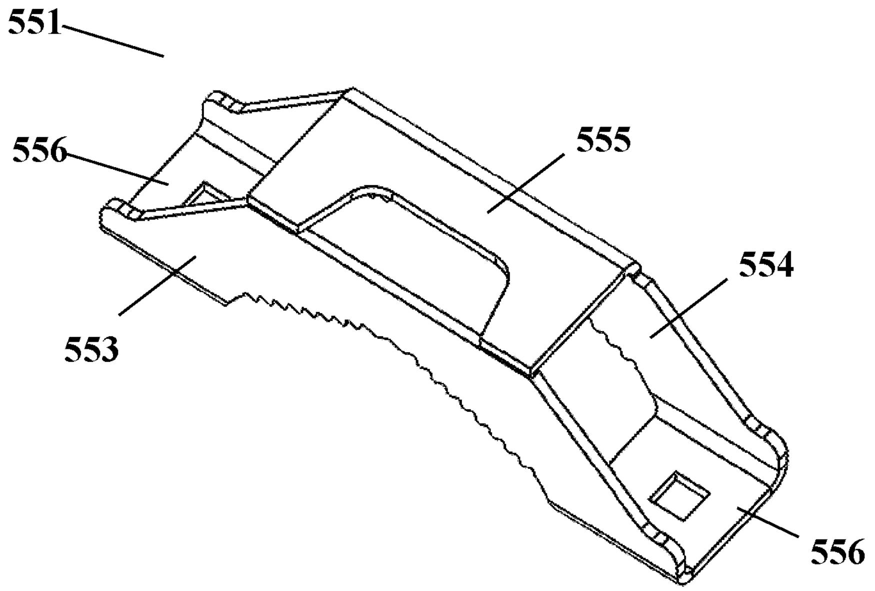
Figure 4C:
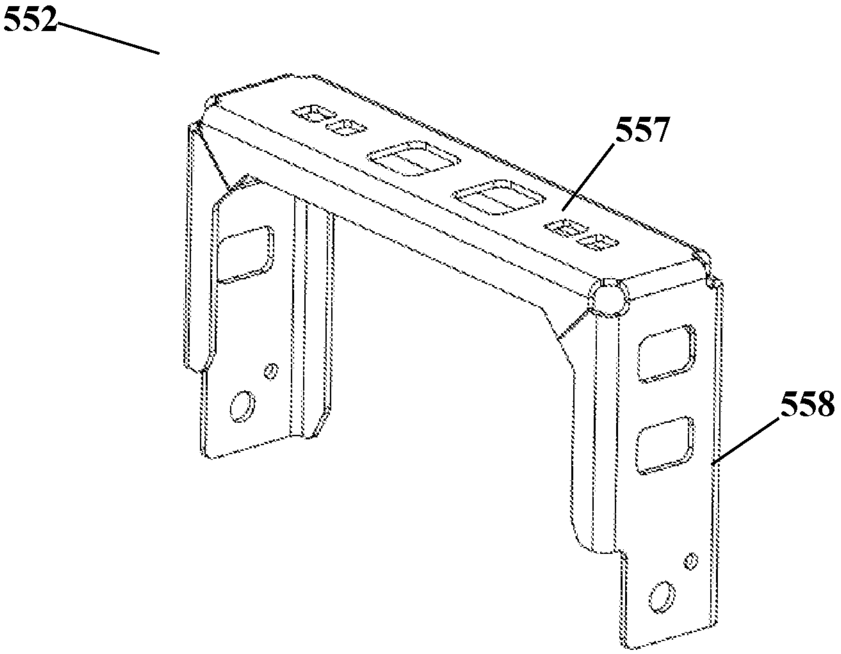

Returning to FIGS. 2A and 2B, the upper mounting assembly 5 includes an upper antenna bracket 51 and an upper mounting pole bracket 55 connected to each other, the upper antenna bracket 51 is fixed to a back surface of the first antenna unit 1, and the upper mounting pole bracket 55 is fixed to the mounting pole 3. FIGS. 4A-4C respectively show perspective views of the upper mounting pole bracket 55 and components. As shown in the figures, the upper mounting pole bracket 55 includes two mounting pole clamps 551 opposite each other, and a connecting bracket 552 fixed to one of the mounting pole clamps 551. The two mounting pole clamps 551 are clamped on the mounting pole 3 in a way that surrounds the mounting pole 3, while the connecting bracket 552 is used to connect to the upper antenna bracket 51.

Each mounting pole clamp 551 includes an upper wall 553 and a lower wall 554 parallel to each other. The upper wall 553 and the lower wall 554 are connected to each other at their radial outer edges by an outer side wall 555. The upper wall 553 and the lower wall 554 are provided with an inner recess in middle portions of their radial inner edges to match an outer contour of the mounting pole 3, thereby allowing the radial inner edges of the upper wall 553 and the lower wall 554 to more closely fit to an outer contoured surface of the mounting pole 3. For example, the outer contour of the mounting pole 3 may be designed to be circular, while the inner recesses of the upper wall 553 and the lower wall 554 are accordingly designed to be circularly arcuate. The radial inner edges of the upper wall 553 and the lower wall 554 are connected to each other by two inner side walls 556 on both sides of the inner recesses. Both inner side walls 556 are provided with connection holes. By passing two bolts through the connection holes of the two inner side walls 556, the two mounting pole clamps 551 can be connected together against the mounting pole 3. This design avoids the attachment of bolts to the outer side wall 555, causing compression forces to deflect the upper and lower walls, thereby distorting the upper and lower walls by force (e.g., upwarping outwardly). In addition, the upper wall 553, the lower wall 554, the outer side wall 555, and the inner side wall 556 of the mounting pole clamp 551 form a closed longitudinal cross-sectional structure and also enhance the ability of the mounting pole clamp 551 to resist deformation.

The connecting bracket 552 is generally U-shaped and includes a base plate 557 and connecting arms 558 extending outwardly from both ends of the base plate 557. The base plate 557 is fixed to the outer side wall 555 of one of the mounting pole clamps 551 by fasteners or the like. The connecting arm 558 is provided with one or more connection holes to connect to the upper antenna bracket 51 through fasteners or the like.

Figure 5A:
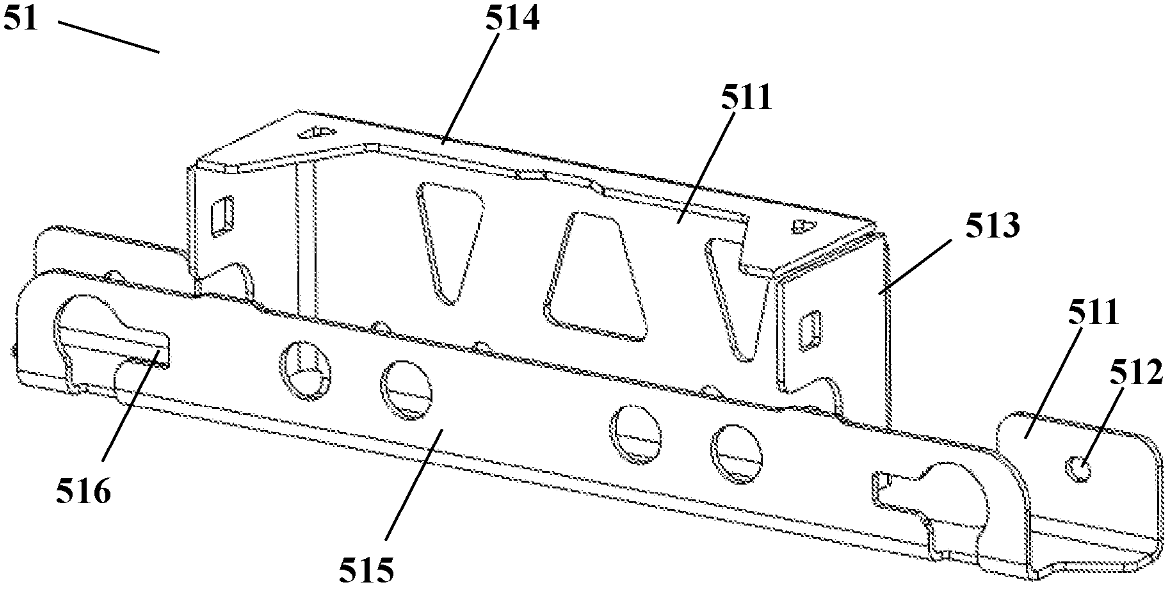
FIGS. 5A-5B respectively show perspective views of different angles of an upper antenna rack.
Figure 5B:
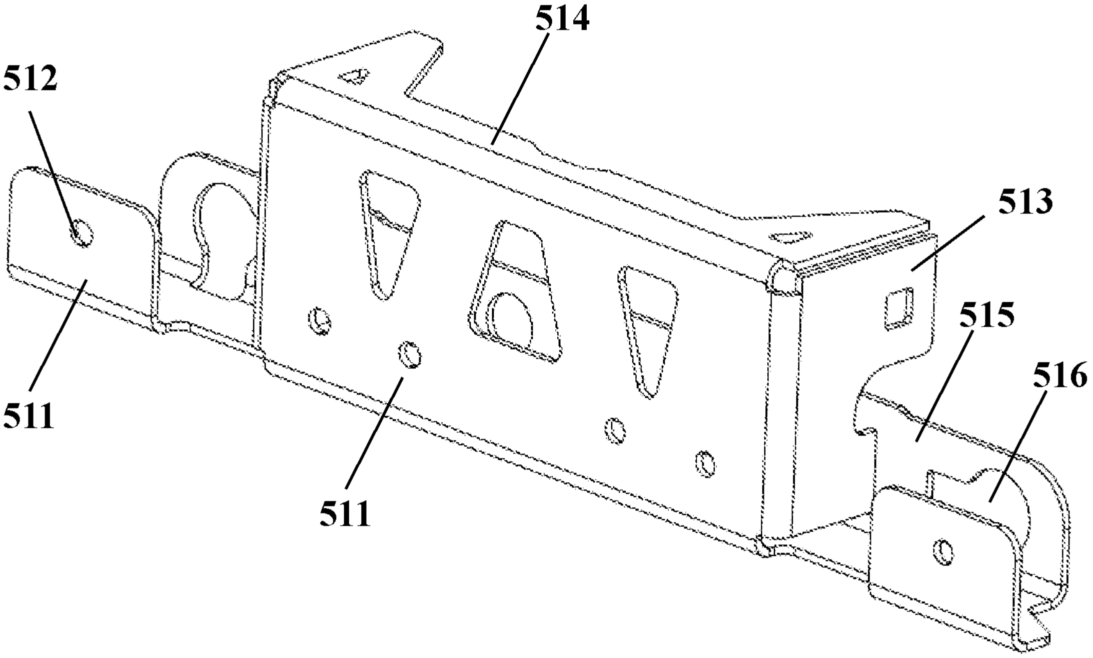

FIGS. 5A-5B respectively show perspective views of different angles of the upper antenna bracket 51. As shown in the figures, the upper antenna bracket 51 includes a main panel 511. The main panel 511 is provided with two connecting arms 513 extending outwardly therefrom. The connecting arm 513 is provided with connection holes corresponding to the position and number of connection holes on the connecting bracket 552 of the upper mounting pole bracket 55. Fasteners (e.g., bolts) may pass through respective connection holes to connect the upper mounting pole bracket 55 to the upper antenna bracket 51. A reinforcing rib 514 may be provided between two connecting arms 513 to enhance the stability of the connecting arms 513. The main panel 511 also includes two or more connection holes 512 to connect to the back surface of the first antenna unit 1 through fasteners (e.g., bolts). The two or more connection holes 512 may be disposed in an outboard area between the two connecting arms 513. In other embodiments, the two or more connection holes 512 may also be disposed in an area between two connecting arms 513. The area provided with the connection hole 512 on the main panel 511 may be separate from the area provided with the connecting arm 513 on the main panel 511. In some embodiments, the area provided with the connection hole 512 on the main panel 511 may also be connected to the area of the connecting arm 513 on the main panel 511.

The main panel 511 is provided with a flange 515 protruding outwardly therefrom for connecting to the top connector 21 of the second antenna unit 2. The flange 515 is configured so that the top connector 21 of the second antenna unit 2 is hooked thereon, and a vertical portion of the flange 515 is provided with connection holes 516 corresponding to the position and number of connection holes 211 of the top connector 21. Fasteners (e.g., bolts) may pass through the corresponding connection holes to connect the top of the second antenna unit 2 to the upper antenna bracket 51. The flange 515 may be provided below the connecting arm 513.

Returning to FIGS. 2A and 2B, the middle mounting assembly 6 includes a middle antenna bracket 61 and a middle mounting pole bracket 65 connected to each other, and the middle antenna bracket 61 is fixed to the back surface of the first antenna unit 1, while the middle mounting pole bracket 65 is fixed to the mounting pole 3. The structure of the middle mounting pole bracket 65 is roughly the same as that of the upper mounting pole bracket 55 and will not be repeated again.

Figure 6A:
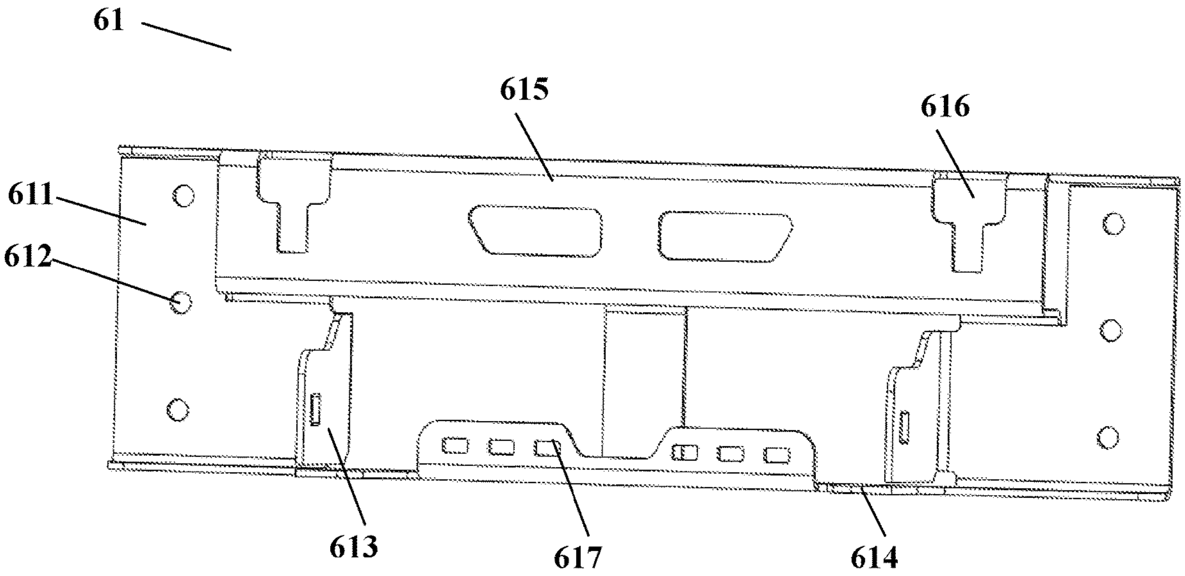
FIGS. 6A-6B respectively show perspective views of different angles of a middle antenna rack.
Figure 6B:
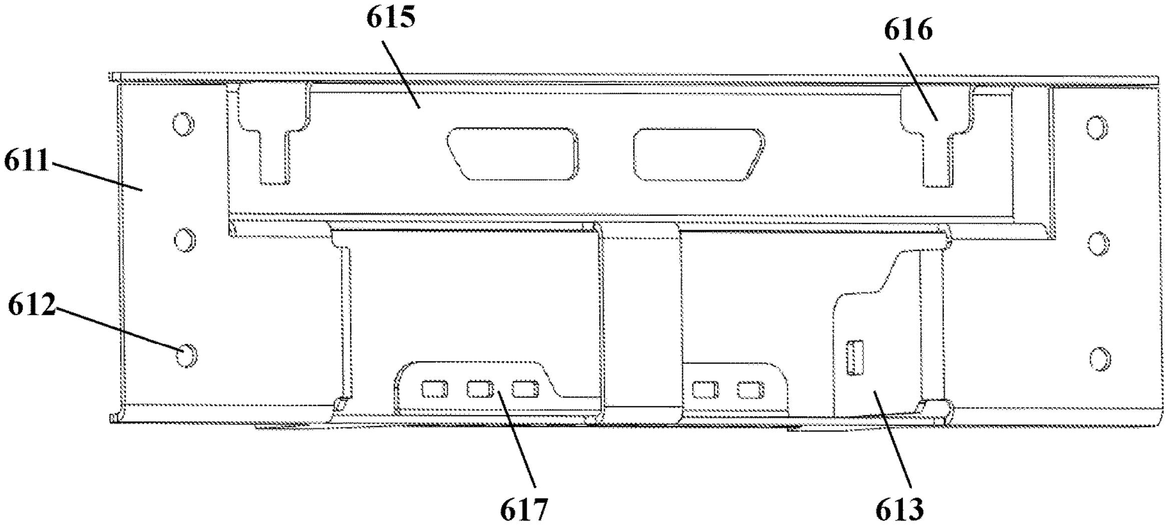

FIGS. 6A-6B respectively show perspective views of different angles of the middle antenna bracket 61. As shown in the figures, the middle antenna bracket 61 includes a main panel 611. The main panel 611 is provided with a connecting portion 615 protruding outwardly therefrom for connecting to the bottom connector 22 of the second antenna unit 2. The connecting portion 615 is provided in the form of a convex portion, and the convex portion 615 is provided with connection holes 616 corresponding to the position and number of connection holes 221 of the bottom connector 22. The bottom connector 22 of the second antenna unit 2 abuts against the connecting portion 615, and fasteners (e.g., bolts) can pass through corresponding connection holes to connect the bottom of the second antenna unit 2 to the middle antenna bracket 61. In some embodiments, a height at which the convex portion 615 protrudes from the main panel 611 is approximately equal to a height at which the flange 515 of the upper antenna bracket 51 is located from the main panel 511, so that the second antenna unit 2 as a whole can be equidistantly spaced from the first antenna unit 1.

The main panel 611 is provided with two connecting arms 613 extending outwardly therefrom. The connecting arm 613 is provided with connection holes corresponding to the position and number of connection holes on the connecting bracket of the middle mounting pole bracket 65. Fasteners (e.g., bolts) may pass through respective connection holes to connect the middle mounting pole bracket 65 to the middle antenna bracket 61. A reinforcing rib 614 may be provided between two connecting arms 613 to enhance the stability of the connecting arms 613. The connecting arm 613 may be disposed below the convex portion 615. In some embodiments, the main panel 611 is provided with a tether plate 617 extending outwardly therefrom, and the tether plate 617 is provided with a plurality of holes that can be connected to tethers. The first antenna unit 1 and/or the second antenna unit 2 have various cables extending outwardly, and the tethers can classify the cables and bind them to the holes of the tether plate 617. The tether plate 617 may be disposed between the two connecting arms 613. In some embodiments, the tether plate 617 may be disposed in an outboard area between the two connecting arms 613.

The main panel 611 includes two or more connection holes 612 to connect to the back surface of the first antenna unit 1 through fasteners (e.g., bolts). The two or more connection holes 612 may be disposed in an outboard area between the two connecting arms 613. In other embodiments, the two or more connection holes 612 may also be disposed in an area between two connecting arms 613. The area provided with the connection hole 612 on the main panel 611, the area provided with the connecting arm 613 on the main panel 611, the area provided with the convex portion 615 on the main panel 611, and the area provided with the tether plate 617 on the main panel 611 may be connected to each other. In some embodiments, the area provided with the connection hole 612 on the main panel 611, the area provided with the connecting arm 613 on the main panel 611, the area provided with the convex portion 615 on the main panel 611, and the area provided with the tether plate 617 on the main panel 611 may be separated from each other.

Returning to FIGS. 2A and 2B, the lower mounting assembly 7 includes a lower antenna bracket 71 and a lower mounting pole bracket 75 connected to each other, and the lower antenna bracket 71 is fixed to the back surface of the first antenna unit 1, while the lower mounting pole bracket 75 is fixed to the mounting pole 3. The structure of the lower mounting pole bracket 75 is roughly the same as that of the upper mounting pole bracket 55 and will not be repeated again.

Figure 7A:
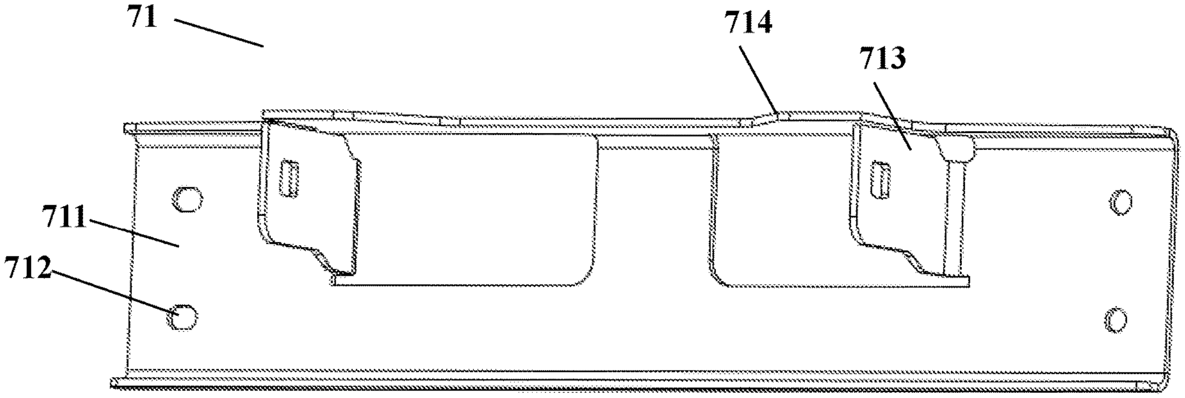
FIGS. 7A-7B respectively show perspective views of different angles of a lower antenna rack.
Figure 7B:
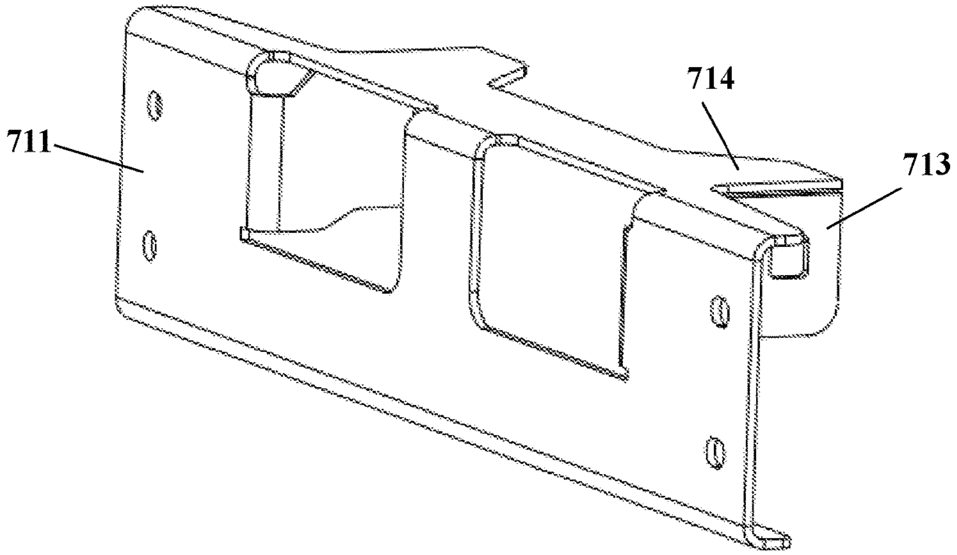

FIGS. 7A-7B respectively show perspective views of different angles of the lower antenna bracket 71. As shown in the figures, the lower antenna bracket 71 includes a main panel 711. The main panel 711 is provided with two connecting arms 713 extending outwardly therefrom. The connecting arm 713 is provided with connection holes corresponding to the position and number of connection holes on the connecting bracket of the lower mounting pole bracket 75. Fasteners (e.g., bolts) may pass through respective connection holes to connect the lower mounting pole bracket 75 to the lower antenna bracket 71. A reinforcing rib 714 may be provided between two connecting arms 713 to enhance the stability of the connecting arms 713. The main panel 711 also includes two or more connection holes 712 to connect to the back surface of the first antenna unit 1 through fasteners (e.g., bolts). The two or more connection holes 712 may be disposed in an outboard area between the two connecting arms 713. In other embodiments, the two or more connection holes 712 may also be disposed in an area between two connecting arms 713. The area provided with the connection hole 712 on the inner main panel 711 may also be connected to the area of the connecting arm 713 on the inner main panel 711. In some embodiments, the area provided with the connection hole 712 on the inner main panel 711 may be separated from the area of the connecting arm 713 on the inner main panel 711.

The following describes the procedure for mounting the integrated base station antenna to the mounting pole using the antenna mounting kit. Fasteners are passed through the connection holes 512 on the main panel 511 of the upper antenna bracket 51, to connect the upper antenna bracket 51 to the back surface of the first antenna unit 1. Fasteners are also passed through the connection hole 612 on the main panel 611 of the central antenna bracket 61 to connect the middle antenna bracket 61 to the back surface of the first antenna unit 1. Further, fasteners are passed through the connection hole 712 on the main panel 711 of the lower antenna bracket 71, to connect the lower antenna bracket 71 to the back surface of the first antenna unit 1.

The top connector 21 of the second antenna unit 2 is hooked onto the flange 515 of the upper antenna bracket 51 and connected thereto with fasteners. The bottom connector 22 of the second antenna unit 2 is positioned to abut against the convex portion 615 of the middle antenna bracket 61 and connected with fasteners, thereby connecting the second antenna unit 2 to the first antenna unit 1. In addition, the cables of the first antenna unit 1 and/or the second antenna unit 2 can be organized by using the tether and bind them to the holes of the tether plate 617 of the middle antenna bracket 61.

Fasteners are passed through the connection holes of the connecting bracket of the upper mounting pole bracket 55 and the connection holes of the connecting arm 513 of the upper antenna bracket 51, to connect the upper mounting pole bracket 55 to the upper antenna bracket 51. Fasteners are passed through the connection holes of the connecting bracket of the middle mounting pole bracket 65 and the connection holes of the connecting arm 613 of the middle antenna bracket 61, to connect the middle mounting pole bracket 65 to the middle antenna bracket 61. Fasteners are passed through the connection holes of the connecting bracket of the lower mounting pole bracket 75 and the connection holes of the connecting arm 713 of the lower antenna bracket 71, to connect the lower mounting pole bracket 75 to the lower antenna bracket 71.

Bolts are used to clamp the two mounting pole clamps of the upper mounting pole bracket 55 on the mounting pole 3 in a way that surrounds the mounting pole 3, and connect the upper part of the first antenna unit 1 to the mounting pole 3. Additional bolts are used to clamp the two mounting pole clamps of the middle mounting pole bracket 65 on the mounting pole 3 in a way that surrounds the mounting pole 3, and connect the middle part of the first antenna unit 1 to the mounting pole 3. Further bolts are employed clamp the two mounting pole clamps of the lower mounting pole bracket 75 on the mounting pole 3 in a way that surrounds the mounting pole 3, and connect the lower part of the first antenna unit 1 to the mounting pole 3. Therefore, the mounting of the integrated base station antenna to the mounting pole 3 is completed.

The antenna mounting kit according to the present disclosure can not only mount the 4G antenna unit to the mounting pole, but also mount the 5G antenna unit to the 4G antenna unit, reducing the number of components required for mounting, simplifying mounting steps, and reducing labor costs.

The antenna mounting kit according to the present disclosure has a solid structure, and the integrated base station antenna can be safely mounted to the mounting pole. The closed longitudinal cross-sectional structure of the mounting pole clamp avoids force deformation of its upper and lower walls and enhances the ability of the mounting pole clamp to resist deformation.

Although the exemplary embodiments of the present disclosure have been described, it should be understood by those skilled in the art that a plurality of variations and changes may be created and made to the exemplary embodiments of the present disclosure without essentially departing from the spirit and scope of the present disclosure. Therefore, all variations and changes are included in the protection scope of the present disclosure defined by the claims. The present disclosure is defined by the attached claims, and equivalents of these claims are also included.

What is claimed is:

1. An antenna mounting kit for an integrated base station antenna, wherein the integrated base station antenna comprises a first antenna unit and a second antenna unit, the second antenna unit comprises a top connector and a bottom connector connecting the second antenna unit to the first antenna unit, and the antenna mounting kit comprises:

an upper mounting assembly, configured to removably connect an upper portion of the integrated base station antenna to a mounting pole, and comprising an upper antenna bracket connected to the first antenna unit and an upper mounting pole bracket connected to the mounting pole, the upper antenna bracket comprising a connecting arm for connecting to the upper mounting pole bracket and a connecting portion for connecting to the top connector of the second antenna unit;

a middle mounting assembly, configured to removably connect a middle portion of the integrated base station antenna to the mounting pole, and comprising a middle antenna bracket connected to the first antenna unit and a middle mounting pole bracket connected to the mounting pole, the middle antenna bracket comprising a connecting arm for connecting to the middle mounting pole bracket and a connecting portion for connecting to the bottom connector of the second antenna unit; and a lower mounting assembly, configured to removably connect a lower portion of the integrated base station antenna to the mounting pole, and comprising a lower antenna bracket connected to the first antenna unit and a lower mounting pole bracket connected to the mounting pole, the lower antenna bracket comprising a connecting arm for connecting to the lower mounting pole bracket;

wherein the upper antenna bracket comprises a main panel, and the connecting portion of the upper antenna bracket protrudes outwardly from the main panel of the upper antenna bracket and is provided below the connecting arm of the upper antenna bracket, and wherein the connecting portion of the upper antenna bracket is provided in a hook shape, the top connector of the second antenna unit is provided in a barb shape, and the top connector of the second antenna unit is capable of being hooked on the connecting portion of the upper antenna bracket and connected thereto by fasteners.

2. The antenna mounting kit according to claim 1, wherein at least one of the upper, middle and lower mounting pole brackets comprises two mounting pole clamps opposite to each other, and a connecting bracket fixed to one of the mounting pole clamps and connecting to a connecting arm of a corresponding antenna bracket, each mounting pole clamp comprises an upper wall and a lower wall, the upper wall and the lower wall are connected to each other by at least one inner side wall at their radial inner edges, and the two mounting pole clamps abut against and are connected to the mounting pole by passing through the at least one inner side wall via bolts.

3. The antenna mounting kit according to claim 2, wherein the upper wall and the lower wall of each mounting pole clamp are provided with inner recesses that fit to the mounting poles in the middle parts of their radial inner edges, and the at least one inner side wall comprises two inner side walls, which are provided on the radial inner edges of the upper wall and the lower wall and are located on both sides of the inner recess respectively.

4. The antenna mounting kit according to claim 2, wherein the upper wall and the lower wall of each mounting pole clamp are connected to each other by outer side walls at their radial outer edges, and the upper wall, lower wall, outer side wall and inner side wall of the mounting pole clamp form a closed longitudinal cross-sectional structure.

5. The antenna mounting kit according to claim 2, wherein the connecting bracket comprises a base plate fixed to one of the mounting pole clamps and connecting arms extending outwardly from both ends of the base plate, and the connecting arms of the connecting bracket are connected to connecting arms of a corresponding antenna bracket by fasteners.

6. The antenna mounting kit according to claim 1, wherein the connecting arm of the upper antenna bracket protrudes outwardly from the main panel of the upper antenna bracket, and is connected to the upper mounting pole bracket by fasteners.

7. The antenna mounting kit according to claim 6, wherein the main panel of the upper antenna bracket is provided with connection holes for connecting to the first antenna unit, and is located on left and right sides of the connecting arm of the upper antenna bracket.

8. The antenna mounting kit according to claim 7, wherein an area provided with the connection holes on the main panel of the upper antenna bracket is separated from an area provided with the connecting arm on the main panel of the upper antenna bracket.

9. The antenna mounting kit according to claim 1, wherein the middle antenna bracket comprises a main panel, and the connecting portion of the middle antenna bracket protrudes outwardly from the main panel of the middle antenna bracket and is provided above the connecting arm of the middle antenna bracket.

10. The antenna mounting kit according to claim 9, wherein the connecting portion of the middle antenna bracket is set as a convex portion, the bottom connector of the second antenna unit is set as a vertical plate shape, and the bottom connector of the second antenna unit abuts against the connecting portion of the middle antenna bracket and is connected thereto by fasteners.

11. The antenna mounting kit according to claim 9, wherein the connecting arm of the middle antenna bracket protrudes outwardly from the main panel of the middle antenna bracket, and is connected to the middle mounting pole bracket by fasteners.

12. The antenna mounting kit according to claim 11, wherein the main panel of the middle antenna bracket is provided with connection holes for connecting to the first antenna unit, and is located on left and right sides of the connecting arm of the middle antenna bracket.

13. The antenna mounting kit according to claim 9, wherein the main panel of the middle antenna bracket is provided with a tether plate extending outwardly therefrom, and the tether plate is provided with a plurality of holes for connecting to tethers.

14. The antenna mounting kit according to claim 1, wherein a height at which the connecting portion of the upper antenna bracket protrudes from the main panel of the upper antenna bracket is approximately equal to a height at which the connecting portion of the middle connecting bracket protrudes from the main panel of the middle antenna bracket.

15. The antenna mounting kit according to claim 1, wherein the lower antenna bracket comprises a main panel, and the connecting arm of the lower antenna bracket protrudes outwardly from the main panel of the lower antenna bracket, and is connected to the lower mounting pole bracket by fasteners.

16. The antenna mounting kit according to claim 15, wherein the main panel of the lower antenna bracket is provided with connection holes for connecting to the first antenna unit, and is located on left and right sides of the connecting arm of the lower antenna bracket.

17. The antenna mounting kit according to claim 1, wherein the first antenna unit and the second antenna unit are respectively a 4G antenna unit and a 5G antenna unit.

18. An antenna mounting kit for an integrated base station antenna, wherein the integrated base station antenna comprises a first antenna unit and a second antenna unit, the second antenna unit comprises a top connector and a bottom connector connecting the second antenna unit to the first antenna unit, and the antenna mounting kit comprises:

an upper mounting assembly, configured to removably connect an upper portion of the integrated base station antenna to a mounting pole, and comprising an upper antenna bracket connected to the first antenna unit and an upper mounting pole bracket connected to the mounting pole, the upper antenna bracket comprising a connecting arm for connecting to the upper mounting pole bracket and a connecting portion for connecting to the top connector of the second antenna unit;

a middle mounting assembly, configured to removably connect a middle portion of the integrated base station antenna to the mounting pole, and comprising a middle antenna bracket connected to the first antenna unit and a middle mounting pole bracket connected to the mounting pole, the middle antenna bracket comprising a connecting arm for connecting to the middle mounting pole bracket and a connecting portion for connecting to the bottom connector of the second antenna unit; and a lower mounting assembly, configured to removably connect a lower portion of the integrated base station antenna to the mounting pole, and comprising a lower antenna bracket connected to the first antenna unit and a lower mounting pole bracket connected to the mounting pole, the lower antenna bracket comprising a connecting arm for connecting to the lower mounting pole bracket;

wherein the middle antenna bracket comprises a main panel, and the connecting portion of the middle antenna bracket protrudes outwardly from the main panel of the middle antenna bracket and is provided above the connecting arm of the middle antenna bracket.

19. An antenna mounting kit for an integrated base station antenna, wherein the integrated base station antenna comprises a first antenna unit and a second antenna unit, the second antenna unit comprises a top connector and a bottom connector connecting the second antenna unit to the first antenna unit, and the antenna mounting kit comprises:

an upper mounting assembly, configured to removably connect an upper portion of the integrated base station antenna to a mounting pole, and comprising an upper antenna bracket connected to the first antenna unit and an upper mounting pole bracket connected to the mounting pole, the upper antenna bracket comprising a connecting arm for connecting to the upper mounting pole bracket and a connecting portion for connecting to the top connector of the second antenna unit;

a middle mounting assembly, configured to removably connect a middle portion of the integrated base station antenna to the mounting pole, and comprising a middle antenna bracket connected to the first antenna unit and a middle mounting pole bracket connected to the mounting pole, the middle antenna bracket comprising a connecting arm for connecting to the middle mounting pole bracket and a connecting portion for connecting to the bottom connector of the second antenna unit; and a lower mounting assembly, configured to removably connect a lower portion of the integrated base station antenna to the mounting pole, and comprising a lower antenna bracket connected to the first antenna unit and a lower mounting pole bracket connected to the mounting pole, the lower antenna bracket comprising a connecting arm for connecting to the lower mounting pole bracket;

wherein the lower antenna bracket comprises a main panel, and the connecting arm of the lower antenna bracket protrudes outwardly from the main panel of the lower antenna bracket, and is connected to the lower mounting pole bracket by fasteners.

* * * * *